Feb. 16, 1932.　　　J. O. POLLACK　　　1,845,098
PRESSURE INDICATOR FOR MECHANICAL DEVICES
Filed Jan. 10, 1929　　　2 Sheets-Sheet 1
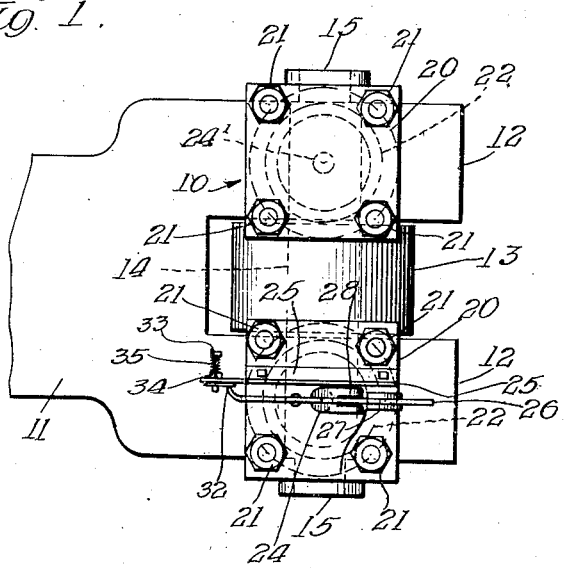
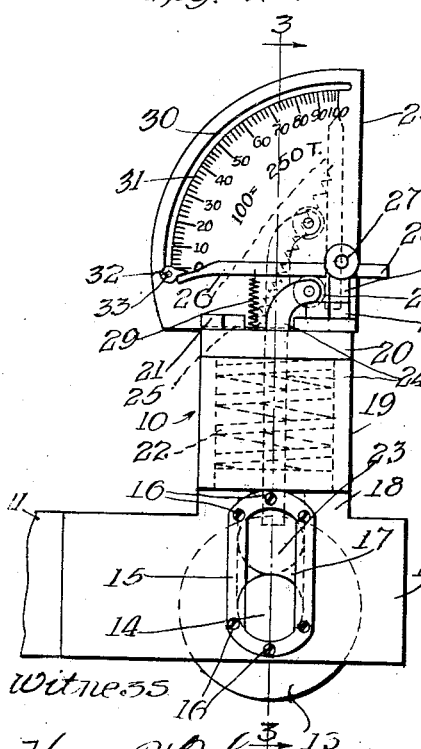
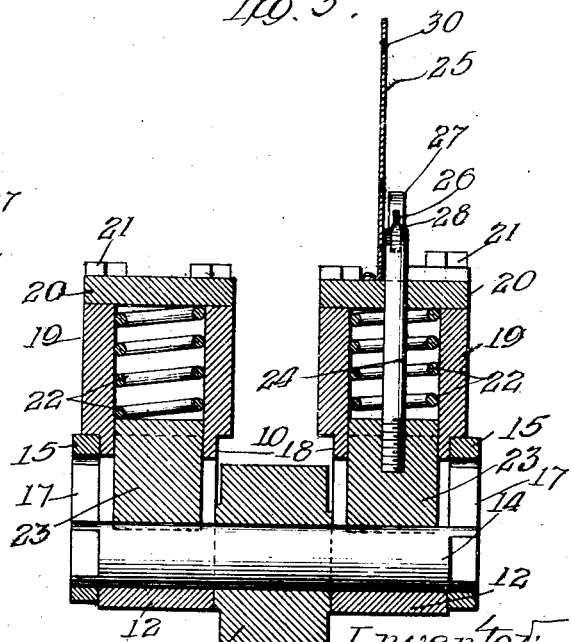
Inventor
Joseph O. Pollack
By Hill & Hill Feb. 16, 1932. J. O. POLLACK 1,845,098
PRESSURE INDICATOR FOR MECHANICAL DEVICES
Filed Jan. 10, 1929 2 Sheets-Sheet 2
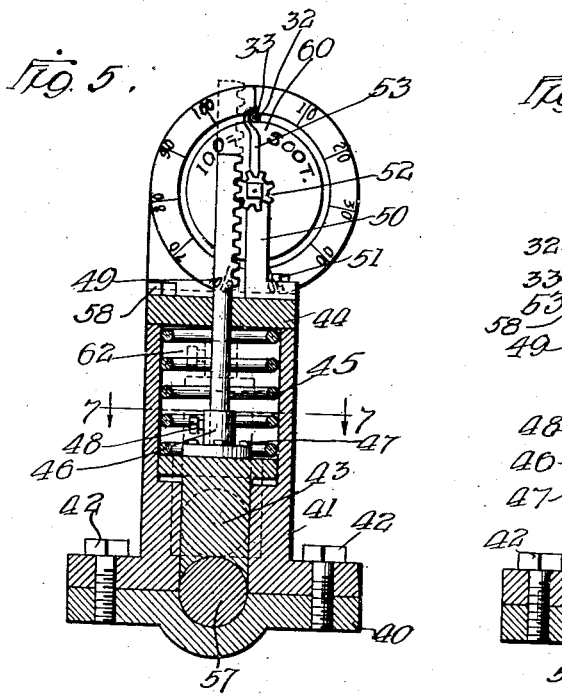
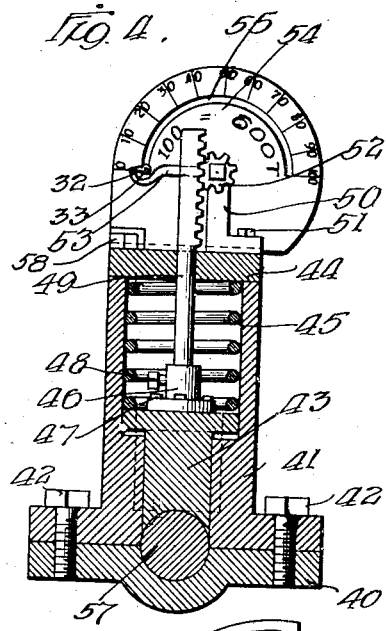
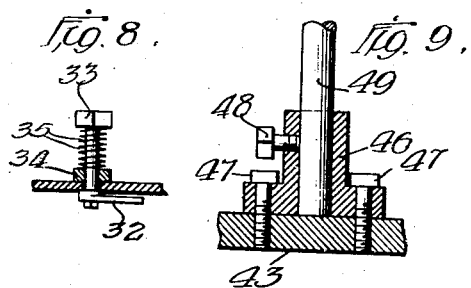
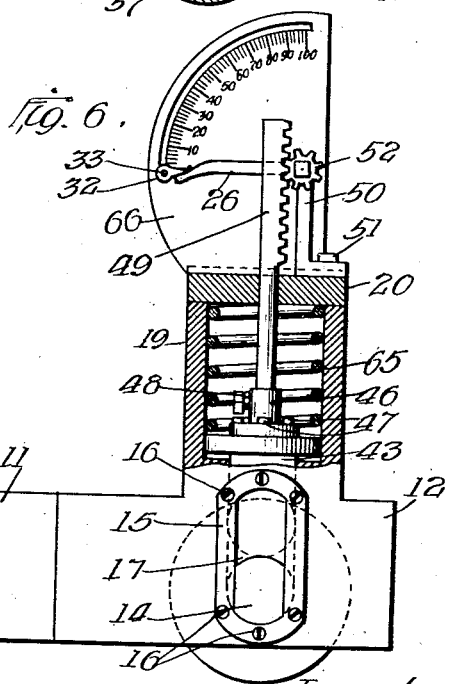
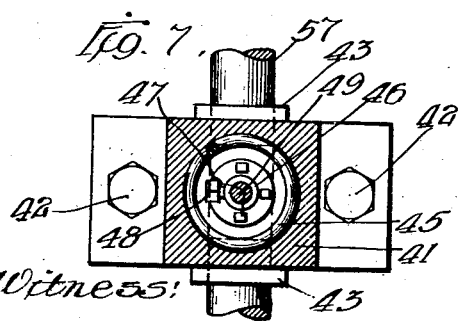
Inventor:
Joseph O. Pollack Patented Feb. 16, 1932

1,845,098

UNITED STATES PATENT OFFICE

JOSEPH O. POLLACK, OF CHICAGO, ILLINOIS

PRESSURE INDICATOR FOR MECHANICAL DEVICES

Application filed January 10, 1929. Serial No. 331,474.

The invention relates to pressure indicators and mechanical devices and more particularly it relates to devices for indicating, within predetermined limits, the maximum instantaneous pressure or force applied upon the work in operations such as forging, stamping, embossing, blanking, punching, forming and the like. There are numerous devices for measuring or indicating the forces exerted by a driving member upon a driven member, such devices being utilized to measure the torque of a revolving shaft or to measure the longitudinal movement of a member. Such devices are not adapted for measuring the relatively large pressures which are instantaneously applied to the work in punch presses, die stamping machines and the like, where the work is done by toggle or similar mechanisms so constructed that the movable parts are formed to move a certain distance in any cycle of operations regardless of the resistance offered by the material upon which the work is being performed. It is well known to those familiar with the operation of such machines that material is occasionally encountered which, to all outward appearances, possesses normal resisting qualities but which is, in fact, highly resistant throughout or lacks uniformity in texture or other qualities. Such material unduly strains the machine parts and since there is no retardation of the movement of the parts, there is nothing to indicate to the operator that the machine is overstressed. As a result, the machine is driven under such conditions until the parts are broken or fractured. One of the objects of the invention is to provide a device which indicates the maximum force being applied by a driving member to a driven member of a machine of the class described up to a predetermined amount.

A preferred form of the invention is shown wherein the indicating mechanism is actuated by a shaft which may be either rotatable or non-rotatable. The mounting of the shaft is such as to permit straight line lateral movement of the shaft in its mounting when pressure is applied transversely to the shaft. The lateral movement of the shaft moves a pointer over a graduated dial plate forming a part of the indicating mechanism to indicate the magnitude of the force measured in pounds or tons applied directly to the work.

The mounting of the shaft provides a stop limiting its transverse or lateral movement to correspond to the predetermined maximum pressure or force applied to the work above which it is considered undesirable or unsafe to operate. Should the work offer unusual resistance so that the predetermined safe working stresses are exceeded, the dial registers the maximum amount and the operator is thereby informed that the machine is being overstressed without indicating the amount of the overstress. The stop member prevents the springs or other resilient members, forming a portion of the indicating mechanism, from being stressed beyond the elastic limit as a result of overloading of the mechanism and insures that the indicating mechanism will register accurately up to the predetermined maximum amount.

Another object of the invention is the provision of an indicating device operable to transmit the actuating force from a driving member to a driven member and to cushion the parts against sudden shocks due to variations in the resisting qualities of the material being worked upon. A further object is the provision of novel means operable to utilize the principle that strain is proportional to stress, and to indicate the magnitude between predetermined limits of the forces acting at any instant of operation of a machine of the class described.

Since the contraction and the expansion of the indicating mechanism is in the direction of the applied force, the resulting movement which is utilized to indicate the force is necessarily lineal. It is desirable for convenience of the operator to translate this lineal movement into a rotary movement of a dial pointer, and another object of the invention is the provision of novel means operable to cause such lineal motion to rotate a pointer over a dial face so graduated that the pointer readings accurately indicate the force actuating the pointer.

Another object of the invention is the production of a device of the class described, which is simple, and suitable for convenient mounting upon any part of a machine or device.

A further object of the invention is the provision of novel means for indicating pressures.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts:

Fig. 1 is a plan view of one embodiment of my invention, shown as mounted on the bifurcated end of a toggle arm;

Fig. 2 is a side elevational view of the device and the end of the toggle arm on which the device is mounted:

Fig. 3 is a section along the line 3—3 of Fig. 2:

Fig. 4 is an elevational view partially in section showing an alternative embodiment of the invention:

Fig. 5 is an elevational and partial sectional view of another embodiment of the invention:

Fig. 6 is an elevational and partial sectional view of still another embodiment of my invention:

Fig. 7 is a view along the line 7—7 of Fig. 5; and

Figs. 8 and 9 are detail views drawn to a larger scale.

Referring now to the drawings, the numeral 10 generally designates an indicator suitably mounted on the free or swinging end of a driven member taking the form of a toggle arm 11. The toggle arm 11 is of the same type as shown in Figs. 1 and 21 of my copending application Serial No. 377,945, filed July 13th, 1929. The arm 11 has a pair of bifurcated end portions 12, between which is a driving member taking the form of a roller 13 mounted upon a shaft 14. The roller 13 is provided to actuate the toggle arm in the performance of any work. The other end of the toggle arm (not shown) may operate to actuate a die in a press, or to perform any other work as heretofore indicated. The roller 13 actuates the toggle arm by its contact with an eccentric cam or with any other suitable device (not shown) wherein the arm is moved in the direction of the arrow and performs work by overcoming resistance. The length of the arm 11 is preferably such that the force applied to the shaft 14 through the roller 13 will result in a force many times greater being applied to the work. The arm 11 is preferably of such a length and so pivoted that a force of 250 tons applied to the work will result from the application of a force of approximately 20 tons upon the shaft 14.

A pair of cylindrical members 19 provide mountings for resisting resilient means taking the form of spiral springs 22. Piston plungers 23 have bearing connection at their lower end with the shaft 14. The springs 22 each bear against a cap member 20 at their upper end and at their lower ends they contact with the upper end of the plungers 23. A plurality of bolts 21 extend through the cap member 20 and down through the cylinders 19 into the end portions 12 of the toggle arm. Plates 15 are fastened to each of the end portions 12 of the toggle arm by means of screws 16. A slot 17 in the plate 15 provides a runway for the end of the shaft 14. Oppositely positioned segments of the end of the shaft 14 are cut away to provide shoulders 36 which hold the shaft in position between the plates 15 and permit the shaft to slidably move in slots 17 as runways.

It is apparent that force effectively exerted upon the roller 13 by an eccentric cam or the like must be applied on the lower portion of the roller and in the general direction of the arrow shown in Fig. 3, and that such force tends to move the roller 13 and shaft 14 upwardly. The springs 22 yieldingly resist the upward movement of the roller 13, as observed in Fig. 3. The springs 22 may be of any required resiliency or resistance and be capable under compression of transmitting the maximum desired force from the driving member or roller 13 to the driven member or toggle arm 11. The movable pistons 28 are in direct contact with the springs 22 and compress the springs in proportion to the force applied by the roller 13.

The dimensions of the various parts, as well as the number of bolts, etc., are to be sufficient to provide the necessary strength and resistance to meet the requirements of the individual device.

An indicating device suitably mounted on one of the cap members 20 includes a rod 24 having a threaded connection with the corresponding piston 23. The rod 24 extends upwardly through the cap member 20. A graduated plate 25, mounted on a standard 37, is fastened to the cap member 20 by screws 38. The plate 25 is graduated in the form of a quadrant, the graduations being marked from 0 to 100 as shown. A rotatable pointer 26 is pivotally mounted on the standard 37 by means of a pin 27. The pointer 26 is operatively connected with the shafts 14 to rotate in accordance with sliding movement of the shaft occasioned by the force applied on the roller 13.

The rod 24 has a roller 28 pivotally mounted thereon and has its upper end curved to bring the rollers into more effective contact with the pointer 26 adjacent its pivot point. A relatively weak spiral spring 29 holds the edge of the pointer 26 in contact with the roller 28. Upon yielding of the springs 22 under forces applied to the roller 13, the rod 24 travels upwardly with the shaft 14 and the pistons 23 from the full line position, as observed in Fig. 2 to a dotted line position therein shown. In Fig. 2 the dotted line position of the pointer 26 represents the maximum amount of movement of the rod 24 in accordance with the strength of the resistance of the spring 22. By reason of the rolling contact of the roller 28 with the edge of the pointer 26 the resulting rotation of the pointer for any given longitudinal movement of the rod 24 is not uniform. In order that the scale readings be correct, for any given movement of the rod 24, the spacings of the graduations corresponding to the force exerted as indicated by the pointer will necessarily be different on different portions of the quadrant and such adjustments are made in calibrating the device.

The springs 22 can be made sufficiently strong that the application of a force of two hundred fifty tons, for example, as shown in Fig. 2, does not stress them beyond the elastic limit, and as a result their yielding is approximately proportional to the force applied. By varying the space of the graduations in the quadrant, so that a given amount of longitudinal movement of the rod will be properly indicated in the readings, the variations in the rotations of the pointer 26 corresponding to a given movement of the rod 24 is properly compensated for. It follows that the indicator will show the amount of force being transmitted from the roller 13 through the toggle arm 11 to the work.

A curved slot 30 is provided in the plate 25 in which a pointer 32 is slidably mounted by means of a bolt 33 and a washer 34. A spring 35 positioned between the head of the bolt 33 and the washer 34 serves to keep the pointer 32 stationary wherever positioned. The pointer 32 lies in the path of and is carried along with the pointer 26. When the pointer 26 travels back to its starting point the pointer 32 remains in its advanced position to indicate the maximum force exerted under the previous operation.

Fig. 4 illustrates another embodiment of the invention fixedly mounted on a stationary member 40. The driven member is not shown and only such portion of the driving member is shown as acts directly upon the indicating mechanism. This direct acting portion takes the form of a shaft 57 which is slidable in a flanged cylindrical member 41 forming part of the indicating mechanism. The shaft 57 may be either rotatable or nonrotatable in operation and functions as the operating means connecting the driving mechanism with the driven mechanism.

The member 41 is fastened to the member 40 by a plurality of bolts 42. A piston plunger 43 is mounted in the member 41 and has a bearing contact at its lower end with the shaft 57. A cap plate 44 is positioned on the top of the cylindrical member 41, being fastened thereto by the requisite number of bolts 58 to withstand the pressure of a spring 45. The plate 44 provides a mounting for a post 50 and a dial plate 54, preferably integrally formed therewith. The post 50 and the plate 54 are fastened to the cap plate 44 by screw bolts 51 or the like. The spring 45 is positioned in the member 41 to resist the upward movement of the plunger 43 in the same manner as for the previously described embodiment. A support member 46 is connected to the plunger 43 by a plurality of screw bolts 47. The member 46 provides a mounting for a rod 49. The rod 49 is fastened at its lower end to the member 46 by a set screw 48 and has a rack formed on its upper end in operative engagement with a pinion 52.

The pinion 52 in rotating actuates the pointer 53 over a semicircular series of graduations, formed on the plate 54. The dial plate 54 is graduated for rotations up to 100 and the spring 45 is so calibrated that rotation of the pointer 53 through a semicircle indicates a force of 600 tons upon the shaft 57. The operative connection of the rack 49 with the pinion 52 provides for a uniform translation of the movement of the shaft 57 into a corresponding rotary motion of the pointer 53. A curved slot 55 and stationary pointer 32 perform the same functions as for the device shown in Fig. 2.

The embodiment shown in Fig. 5 differs from the embodiment shown in Fig. 4 only in that the graduations of the dial plate 60 extend substantially around the plate and provide for relatively greater yielding of the spring 62 than of the spring 45 for a maximum indicated allowable force.

In Fig. 6, I have shown still another embodiment of the invention differing from that shown in Fig. 1. This difference consists in substituting a rack rod 49 and a pinion 52 for the rod 24 and the roller 28 which acts as an actuating means for the pointer and in providing a dial plate 66 showing the graduations, and a slot as extending through a quadrant.

Thus it will be seen that I have provided an indicating device which is operable to measure the force necessarily exerted in transmitting motion from a driving member to a driven member, and improved means for compensating for the variations in movement of a rotary pointer having contact with a longitudinally movable member.

Having thus described my invention, it is obvious that various immaterial modifications may be made in the same without departing from the spirit of my invention, hence I do not wish to be understood as limiting myself to the exact form and construction herein shown and described, or uses mentioned.

What I claim as new and desire to secure by Letters Patent is:

1. In combination, an arm movable about a pivot, a combination pressure indicating and actuating device mounted upon the swinging end of the arm, said device comprising a shaft extending transversely to the arm, mounting means permitting a straight line movement of the shaft transversely to its axis within predetermined limits, a cylinder fixedly mounted on the arm, the axial line of said cylinder substantially coinciding with the path of said shaft, a plunger projecting from the cylinder with its outer end in contact with said shaft, and spring means in the cylinder yieldingly holding the plunger and shaft against movement.

2. In combination, a toggle arm of the kind described, a shaft extending transversely to the arm, means fixedly mounted on the arm providing a mounting for the shaft, said mounting means permitting lateral straight line movement of the shaft within predetermined limits, a pair of cylinders fixedly mounted on the arm, piston plungers projecting from the cylinders with their extreme ends in contact with said shaft, spring means within said cylinders normally holding said plungers in their extreme outer position, said spring means yielding to permit movement of the shaft in its mounting transverse to its axis.

3. In combination, an arm of the kind described, means for actuating said arm comprising a shaft transversely mounted on the arm, a mounting permitting lateral straight line movement of the shaft relative to the arm, a member forming a stop limiting the amount of movement of said shaft, spring means operable to hold said shaft at one extremity of its mounting and to yield under pressure on said shaft to permit corresponding movement of the shaft in its mounting, and an indicating mechanism operable, by the movement of said shaft in its mounting, to measure the corresponding force exerted by said arm, said indicating device remaining quiescent when said shaft comes in contact with said stop member.

4. A bifurcated toggle arm of the kind described, means for actuating said arm comprising a shaft, the bifurcated portions of the arm having slots extending transversely to the axis of the arm, said shaft being slidably mounted in and movable in said slots, a stop member limiting the amount of movement of said shaft in said slots, spring means on each bifurcated portion operable to hold said shaft at one extremity of its mounting and to yield under pressure on said shaft to permit a corresponding movement of the shaft in its mounting, and an indicating mechanism operable, by the movement of said shaft in its mounting, to measure the corresponding force exerted by said arm, said indicating device remaining quiescent when said shaft is in contact with said stop member.

In witness whereof, I hereunto subscribe my name this 4th day of January, A. D. 1929.

JOSEPH O. POLLACK.